UNITED STATES PATENT OFFICE 2,083,040

COATED LEATHER

Ralph C. Shuey, Mountain Lakes, N. J., assignor to Bakelite Corporation, New York, N. Y., a corporation of Delaware No Drawing. Application November 6, 1931, Serial No. 573,526. Renewed February 14, 1936

14 Claims. (Cl. 91—68)

This invention relates to the manufacture of coated leather or equivalent articles and generally known as patent leather.

In the commercial manufacture of coated leather, the tanned skin is tightly stretched and covered with several layers of linseed oil varnish one or more of which contain a pigment such as lamp black or Prussian blue. After the final coating, the skin is either exposed to sunlight or to artificial light which contains a large proportion of ultra-violet rays which harm the leather. This exposure to light, although very costly due to the required labor and to the investment in material tied up during the exposure period, has heretofore been found necessary for the preparation of the best quality patent leather, but even though this be done it is well known that the usual patent leathers do not wear well and have other glaring faults. Among these are loss of flexibility with age, increasing brittleness as the temperature drops so that cracking takes place and a tendency to become sticky or tacky in hot and humid weather.

The present invention has for an object the overcoming of the defects in the present processes, coatings and articles. It has been demonstrated that by using the materials and carrying out the process later described, a coated leather can be obtained that is much more satisfactory than the best grade of patent leather heretofore made, in that it has increased permanency of flexibility or distensibility, markedly decreased tendency to become brittle and to crack, improved toughness and resistance to abrasion, freedom from stickiness or tackiness, etc. Furthermore it can be manufactured and used under conditions where the commercial patent leathers are unsatisfactory; and in addition, the manufacture of patent leather is greatly facilitated by the present invention because the time or temperature usually required for drying the several coatings can be materially lowered to yield a leather having the above desirable properties without exposure to sunlight or ultra-violet rays heretofore deemed necessary even though the leather is harmed thereby.

These highly useful and technically important improvements in patent leather and its manufacture are brought about in accordance with this invention by incorporating instead of oils as heretofore, oils modified by phenolic condensation products soluble in or made soluble in oils customarily used and found suitable for coated leather manufacture. Preferably the condensation products are of types which possess the oil-soluble property without necessitating the addition of any solubilizing agent like rosin. Such an oil-soluble condensation product, for example, is obtainable from a substituted phenol having a molecular weight higher than 121, such as a multiple ring phenol for instance ortho- or para-hydroxy-diphenyl, reacted with formaldehyde; the product can be heated with tung oil and thereafter dissolved in linseed oil or dissolved directly in the linseed oil. Another type of oil soluble condensation product can be made by reacting a phenol such as cresol with tung oil and hexamethylene-tetramine which product is also soluble in linseed oil. Phenol condensation products soluble in oil, can likewise be prepared by methods other than those specified and furthermore the products may be made from the raw materials directly in the presence of the main body of oil. Phenolic resins which are not oil soluble but rendered so by the addition of rosin or its equivalents are not as satisfactory as those prepared without the use of rosin since the effect of rosin, ester gum or other common resins is to counteract the beneficial results attributable to the phenolic resins.

An oil soluble condensation product can first be prepared by itself and then be introduced directly into a drying oil which is used for coating the leather, or it can be dissolved in a small amount of the same or a different oil which is thereafter incorporated in the main body of oil. An oil modified by a phenolic condensation product can also be prepared by digesting a phenolic body in the main body of oil (or in a smaller portion of the same or different oil) and thereafter adding a methylene-containing body to react with the phenolic body and form the phenolic condensation product. If a phenolic condensation product is prepared separately, it can be introduced into the main body of oil at any time before the oil becomes so thick that the condensation product cannot easily be incorporated; but as the condensation product assists in the bodying of the oil and decreases the time necessary to thicken the oil, it can be introduced at the time that the oil is being bodied just prior to use. After the condensation product is added to the oil (which oil may be raw, bodied or blown), the oil is cooked until the desired viscosity is obtained.

A small amount of drier can also be introduced into the oil. This drier may be iron linoleate, litharge, cobalt salt, Prussian blue, etc. All of these driers have been previously used but a rather large proportion has been required. With the inclusion of a synthetic phenolic condensation product, however, a much smaller proportion of all driers is possible and Prussian blue need be the only drier used. The advantage in decreasing the amount used, is that a deposited film retains the flexibility it would otherwise lose due to the continued accelerated chemical action by larger proportions of driers.

Leather cannot be treated in the manner customary in applying coatings to paper, metal and similar bases on account of the arrangement of its fibers and its extensibility. I have found however that the application of a barrier coat permits one or more succeeding coats of an oil modified by a phenolic condensation product to thereby yield a product with improved characteristics as described above. Preferably the barrier coat as well as other coats is an oil modified by the inclusion of a phenolic condensation product since the extensive oxidization necessary to give sufficient body appears to be largely replaced by polymerization with the concomitant result of markedly increased life and flexibility.

In the preferred practice of the invention, the skin or other equivalent base is stretched tightly on a board or other support and a barrier or "daub" coat is applied to fill the base. This daub coat is a heavy bodied oil which may be made by cooking the oil and condensation product until it is practically a jelly which is then diluted with petroleum thinners until it has the consistency of a very heavy varnish but is buttery rather than stringy. The coating material is generally applied with a sponge or a knife rubbed into the base. Thereafter the coated leather is baked to dry the coating, less baking and lower temperature being required than in the case of the usual patent leathers; for instance a baking at about 65° C. for a few hours is sufficient though for convenience the baking can be continued overnight.

After the heavy daub coat has been applied to the base and has dried, a spray coat of oil containing a synthetic condensation product and drier, which is more fluid than the daub coat and sufficiently fluid to be sprayed, is applied over the daub coat to even up the surface and provide a smooth base for a third coat. The spray and other coatings can be prepared by cooking the oil-phenolic condensation product mixture until it is substantially a heavy viscous mass just short of the jelling state so that upon dilution with approximately an equal volume of mineral spirits it has the body of a normal varnish. After the spray coat is applied the skin is again stoved or baked to harden the coating.

The so-called "color coat" is next applied. Dark pigments such as carbon black, may be applied in the daub coat or the spray coat but usually the third coat or "color coat" is the only coating which contains the relatively expensive Prussian blue color. After it is applied the skin is permitted to stand for a sufficient period of time to allow the coating to take a preliminary set. Thereafter the coating is baked to harden it. After being thoroughly hardened, the coating may be rubbed with pumice or rotten stone to smooth it and thereafter the finish coat of bodied oil and condensation product is applied.

The finish coat is usually clear and serves to protect the color coat and, of course, adds its own desirable qualities to the coatings. If the finish coat is carefully applied, it has an inherent gloss rendering polishing unnecessary after baking and, because of the phenolic condensation product which the various coatings contain, it is also unnecessary to expose the finished skin to sunlight after baking the finish coating.

Although the previous description of the invention has referred particularly to the use of linseed oil, other drying oils such as tung oil, soya bean, perilla and rape seed oil may be used.

For completeness of disclosure, several examples of compositions that can be used will be given but it is to be understood that it is impractical to give examples including all of the variations which may be worked out and found practical for coating materials. In particular, the proportions of ingredients are subject to variation.

Example 1

An oil soluble phenolic condensation product, obtained from a phenol containing two or more benzene rings such as an hydroxy-diphenyl and substantially an equal weight of commercial formaldehyde in solution or its equivalents in other aldehyde or methylene containing materials, is heated together with say, an equal weight of China-wood oil until a sample on cooling remains clear and will stand dilution with an equal weight of cold linseed oil without clouding. Linseed oil is then slowly added while maintaining an elevated temperature say, substantially from 200° C. to 300° C. and the heat is maintained until the desired viscosity is obtained. The viscosity will be determined in accordance with the usual practice, that is, a heavier body will be used for the daub coat than for the other coats. If desired, a large quantity of linseed oil can be blown or bodied to approximately the desired viscosity and then the condensation product in admixture with tung oil can be thoroughly stirred in after which the oil may be further heated until the desired body is obtained. It is recognized that other methods of making the mixture of the oil soluble condensation product with linseed oil may be used. The oil soluble phenolic condensation product may run from 1 to 50 per cent of the weight of the linseed oil but 20 to 35 per cent is preferred. Below 1 per cent the effect of the condensation product is noticeable but of less practical value and above 50 per cent of the condensation product at present is too costly for the advantages obtained. The previously mentioned driers may be added in small amounts usually from about 1/100 to 1/10 of a per cent for the active cobalt driers, up to possibly 2 per cent for the rather inactive iron driers or possibly up to 3 or 4 per cent for Prussian blue. If an organic acid is used to smooth out the coat, the amount of such acid may run up to 4 or 5 per cent for fatty acids of the drying oils. After the desired viscosity is obtained, the oil is diluted with mineral spirits or equivalent varnish thinners to the extent previously indicated.

Example 2

An oil-soluble resin prepared from commercial cresol, tung oil and hexamethylenetetramine has bodied linseed oil added thereto until approximately nine times the volume of the cresol is mixed in. The complete mix is then heated until the desired viscosity is obtained and further treated as in the foregoing example.

Example 3

Phenol with approximately twice its weight of linseed oil with approximately 1 per cent of a converting agent such as phosphoric acid are heated under a reflux condenser until the reaction appears complete. The reacted mass is then cooled by the addition of an equal weight of linseed oil and approximately 5 to 10 per cent of paraform is added after which the ingredients are heated under a reflux condenser until the desired viscosity is obtained. This yields a composition suitable as such for coatings when modified as to viscosity and other ingredients as explained above.

*Example 4*

100 parts of phenol, 150 to 200 parts of tung oil (10 to 50 parts more or less, of which may be replaced by linseed oil), 100 parts of commercial formaldehyde solution and substantially 100 parts of rosin are heated together until the reaction appears complete. The mass is cooled, the water is drained off and 800 parts of linseed oil are added after which the mass is heated until the desired viscosity is obtained.

*Example 5*

A resin prepared from about equal molecular proportions of cresol and formaldehyde is cooked with rosin or ester gum, the latter constituting about 60 per cent of the mixture. This is heated for several hours at about 250 to 300° C. to obtain an oil-soluble resin. Its addition to linseed or other drying oil requires a longer digestion at considerably higher temperature (about 300° C.) than phenol condensation products which in themselves are oil-soluble; furthermore the addition of rosin should be kept as low as practical to minimize its destructive effects on life and flexibility of a deposited film. To reduce the acid number of a phenol resin cooked with rosin, glycerine can be added prior to the digestion with the drying oil. The oil composition is bodied to the desired extent by continuing the heating, and it is applied in accordance with the foregoing.

The selected driers are preferably added toward the end of the cook or as the mass is cooling after the last heating, and are well stirred into the mixture until thoroughly incorporated. The coloring matter is incorporated into the finished product in the usual manner after the mass is cold.

In comparing this type of coating with the ordinary patent leathers, it is worthy to note that because of the very noticeably higher water resistance of this type of coating the coated leather will be much less subject to change in physical characteristics with marked changes in humidity and temperature. Having very good elasticity it will retain its shape under moist or hot conditions much better than an oil coating which can easily take on a permanent set if stretched while wet. Also because of a high resistance to the effect of alkalies, it can be washed with soap and water without injury if it is desired to remove wax, grease or other substances accidentally adhering to it.

I claim:

1. Coated leather of the patent leather type comprising in combination a leather base and a coating applied to said base containing a drying oil and a modifying agent soluble in said oil and comprising a resinous reaction product of a phenol with an aldehyde, said agent imparting to the dried coating flexibility and distensibility characterizing a dried oil coating without a resinous content but superior thereto in a retention of flexibility and distensibility upon aging.

2. Coated leather of the patent leather type comprising in combination a leather base and a coating applied to said base containing a drying oil comprising linseed oil and a modifying agent soluble in said oil, and comprising a resinous reaction product of a phenol with an aldehyde, said agent imparting to the dried coating flexibility and distensibility characterizing a dried oil coating without a resinous content but superior thereto in a retention of flexibility and distensibility upon aging.

3. Coated leather of the patent leather type comprising in combination a leather base and a coating applied to said base containing a drying oil comprising tung oil and a modifying agent soluble in said oil and comprising a resinous reaction product of a phenol with an aldehyde, said agent imparting to the dried coating flexibility and distensibility characterizing a dried oil coating without a resinous content but superior thereto in a retention of flexibility and distensibility upon aging.

4. Coated leather of the patent leather type comprising in combination a leather base and a coating applied to said base containing a drying oil and a modifying agent soluble in said oil and comprising a resinous reaction product of a phenolic body with a molecular weight above 121 with an aldehyde, said agent imparting to the dried coating flexibility and distensibility characterizing a dried oil coating without a resinous content but superior thereto in a retention of flexibility and distensibility upon aging.

5. Coated leather of the patent leather type comprising in combination a leather base and a coating applied to said base containing a drying oil and a modifying agent soluble in said oil and comprising a resinous reaction product of a multiple-ring phenolic body with an aldehyde, said agent imparting to the dried coating flexibility and distensibility characterizing a dried oil coating without a resinous content but superior thereto in a retention of flexibility and distensibility upon aging.

6. Coated leather of the patent leather type comprising in combination a leather base and a coating applied to said base containing a drying oil and a modifying agent soluble in said oil and comprising a resinous reaction product of hydroxy diphenyl with an aldehyde, said agent imparting to the dried coating flexibility and distensibility characterizing a dried oil coating without a resinous content but superior thereto in a retention of flexibility and distensibility upon aging.

7. Process of making coated leather of the patent leather type which comprises treating a drying oil with a modifying agent soluble in said oil and comprising a resinous reaction product of a phenol with an aldehyde by heating at a temperature approximately within the range of 200 to 300° C., applying the resulting product in the form of a varnish to a leather base, and baking the leather so coated to yield a flexible and distensible article.

8. Process of making coated leather of the patent leather type which comprises treating a drying oil with a modifying agent soluble in said oil and comprising a resinous reaction product of a phenol with an aldehyde by heating at a temperature approximately within the range of 200 to 300° C., the proportion of said resinous product approximating from 20 to 35 per cent by weight of the drying oil, applying the resulting product in the form of a varnish to a leather base, and baking the leather so coated to yield a flexible and distensible article.

9. Process of making coated leather of the patent leather type which comprises treating a drying oil with a modifying agent soluble in said oil and comprising a resinous reaction product of a phenol with an aldehyde by heating at a temperature approximately within the range of 200 to 300° C., applying the resulting product in the form of a varnish to a leather base, and baking the leather so coated to yield a flexible and distensible article free from tackiness in the absence of applied sunlight.

10. Process of making coated leather of the patent leather type which comprises treating a drying oil with a modifying agent soluble in said oil and comprising a resinous reaction product of a phenol with an aldehyde by heating at a temperature approximately within the range of 200 to 300° C., adding a drier and a fatty acid, applying the resulting product in the form of a varnish to a leather base, and baking the leather so coated to yield a flexible and distensible article.

11. Coated leather of the patent leather type comprising in combination a leather base and a coating applied to said base containing a drying oil and a modifying agent soluble in said oil and comprising a resinous reaction product of a phenol with an aldehyde, in a quantity sufficient to impart improved properties over those characterizing a dried oil coating without a resinous content.

12. The process of making coated leather of the patent leather type which comprises treating a drying oil with a modifying agent soluble in said oil and comprising a resinous reaction product of a phenol with an aldehyde by heating at a temperature of about 450° F., applying the resulting product in the form of a varnish to a leather base and baking the leather so coated.

13. Coated leather of the patent leather type comprising in combination a leather base and a coating applied to said base containing a bodied drying oil and a modifying agent soluble in said oil and comprising a resinous reaction product of a phenol with an aldehyde in a quantity sufficient to impart improved properties over those characterizing a dried oil coating without a resinous content.

14. Process of making coated leather of the patent leather type which comprises bodying a drying oil, treating the bodied oil with a modifying agent soluble in said oil and comprising a resinous reaction product of a phenol with an aldehyde, applying the resulting product in the form of a varnish to a leather base and baking the leather so coated.

RALPH C. SHUEY.